(12) United States Patent
Kusano

(10) Patent No.: US 6,789,857 B2
(45) Date of Patent: Sep. 14, 2004

(54) VEHICLE BRAKE HYDRAULIC PRESSURE GENERATOR

(75) Inventor: Akihito Kusano, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/375,352

(22) Filed: Feb. 28, 2003

(65) Prior Publication Data

US 2004/0004392 A1 Jan. 8, 2004

(30) Foreign Application Priority Data

Feb. 28, 2002 (JP) ........................ 2002-053454

(51) Int. Cl.$^7$ .............................. B60T 8/44; B60T 13/14
(52) U.S. Cl. .............................. 303/114.1; 303/122.09; 188/358; 60/582; 60/593
(58) Field of Search .......................... 303/113.1, 113.4, 303/114.1, 122, 122.09, 122.1, 122.11, 122.12, 122.13, 122.14; 188/355, 358, 359, 360; 60/545, 547.1, 579, 580, 581, 593

(56) References Cited

U.S. PATENT DOCUMENTS

| | | | |
|---|---|---|---|
| 4,126,996 A | | 11/1978 | Leiber |
| 4,143,514 A | * | 3/1979 | Leiber ................ 303/114.1 |
| 4,715,661 A | * | 12/1987 | Leiber ................ 60/581 |
| 6,705,682 B2 | * | 3/2004 | Kusano et al. ............ 303/114.1 |
| 6,709,072 B2 | * | 3/2004 | Kusano et al. ............ 188/358 |
| 2003/0168909 A1 | * | 9/2003 | Kusano ................ 303/114.1 |

FOREIGN PATENT DOCUMENTS

| | | |
|---|---|---|
| DE | 26 07 140 A1 | 8/1977 |
| EP | 1 078 833 A2 | 2/2001 |
| JP | 61-37140 B2 | 8/1986 |

* cited by examiner

*Primary Examiner*—Thomas Williams
(74) *Attorney, Agent, or Firm*—Burns, Doane, Swecker & Mathis, L.L.P.

(57) ABSTRACT

An improved brake hydraulic pressure generating device is provided in which the hydraulic pressure supplied from a hydraulic pressure source is adjusted to a value corresponding to the brake operating force by means of a pressure adjusting valve which is activated according to displacement of an input piston or a simulator piston, and while the device is normal, a master cylinder is activated by the output hydraulic pressure. If the hydraulic pressure source or a hydraulic line connecting thereto fails, a sufficient braking force is ensured with a short stroke. There are provided a shutoff valve which shuts off communication between the simulator chamber and the atmospheric reservoir when the stroke of the input piston has exceeded a predetermined value, and a check valve which permits the flow of fluid from the atmospheric reservoir to the simulator chamber. This suppresses an unavailable stroke of the simulator piston without impairing the return of the simulator piston.

4 Claims, 3 Drawing Sheets

VEHICLE BRAKE HYDRAULIC PRESSURE GENERATOR

BACKGROUND OF THE INVENTION

This invention relates to a vehicle brake hydraulic pressure generator in which the hydraulic pressure supplied from a hydraulic pressure source including a power-driven pump is adjusted by a pressure adjusting valve to a value corresponding to the brake operating force and outputted to a first hydraulic line, the output hydraulic pressure is used to activate a master cylinder, and the hydraulic pressure generated by the master cylinder is given to a second hydraulic line that is independent of the first hydraulic line, and if the first hydraulic line fails, the brake operating force is directly transmitted to the master cylinder to activate it.

As a brake hydraulic pressure generator of this type, there are ones disclosed in JP patent publication 61-37140 and European patent EP1078833A2.

The device of the former publication applies brake operating force from a brake pedal to an operating rod inserted in a booster piston and transmits the brake operating force to an input rod in the booster piston through a stroke-limiting spring. The input rod closes an outlet valve and opens an inlet valve to adjust the hydraulic pressure fed by a pump into a pressure accumulating chamber in front of the booster piston and the hydraulic pressure is outputted to a first hydraulic line. The output hydraulic pressure after adjusted is also used as pressure for activating the master cylinder to output the hydraulic pressure generated in the master cylinder to a second hydraulic line. In this device, if the hydraulic pressure source having a power-driven pump fails, the brake operating force applied to the operating rod is directly transmitted to a piston of the master cylinder through the stroke limiting spring, input rod, booster piston and a tappet rod mounted on the booster piston, so that hydraulic pressure corresponding to the brake operating force is generated in the master cylinder.

The device of the latter publication includes an auxiliary piston and a simulator piston corresponding to the operating rod of the first-mentioned device. The brake operating force applied to the simulator piston is transmitted to the auxiliary piston through a stroke-imparting elastic member (spring and rubber). The hydraulic pressure supplied from a hydraulic pressure source having a pump is adjusted by means of a pressure adjusting valve of which the operating condition changes with displacement of the auxiliary piston, to a value corresponding to the brake operating force, and the master cylinder is activated by the hydraulic pressure after adjusted. In this device, too, if the hydraulic pressure source fails, the brake operating force is directly transmitted to the master cylinder.

In the brake hydraulic pressure generator of JP patent publication 61-37140, which uses a brake booster, a stroke corresponding to the brake operating force is imparted to the operating rod by the stroke-limiting spring even during failure of the hydraulic pressure source. Since it becomes an unavailable stroke, during failure of the hydraulic pressure source, in order to obtain a sufficient braking force, a long operating stroke to which is added the unavailable stroke is needed.

On the other hand, in the device of EP1078833A2 publication, when the auxiliary piston moves by more than a predetermined stroke relative to the casing, a communicating passage between the simulator chamber formed in front of the simulator piston and the atmospheric reservoir is shut off. During failure of the hydraulic pressure source, hydraulic pressure that balances with the brake operating force is not applied to the auxiliary piston, so that shutoff of the communicating passage occurs earlier and brake fluid is sealed in the simulator chamber. This restricts the stroke of the simulator piston, so that it is possible to produce a sufficient braking force with a short operating stroke.

But if the hydraulic pressure source fails during brake operation, the communicating passage is shut off in a situation where the simulator piston is ordinarily making a stroke, so that even if quick return of the brakes is carried out thereafter, return of the auxiliary piston, which is dependent upon the master cylinder, is delayed. Thus, the communicating passage is kept shut, so that the simulator piston will not return to the original position. Thus, if quick operation of the brake is carried out followed by quick return, the non-returned amount of the simulator piston will become an unavailable stroke, so that the operating stroke for ensuring a sufficient braking force becomes long.

An object of the invention is to ensure a sufficient braking force with a short operating stroke even if the hydraulic pressure source or a hydraulic line connecting thereto should fail.

SUMMARY OF THE INVENTION

This invention proposes to improve a vehicle brake hydraulic pressure generating device comprising a hydraulic pressure source for generating a predetermined hydraulic pressure, an atmospheric reservoir, a stroke simulator, the stroke simulator comprising a simulator piston operatively coupled with a brake operating member and an elastic member for imparting a stroke corresponding to the brake operating force to the simulator piston and a simulator chamber formed in front of the simulator piston, an input piston having the simulator piston therein for receiving the brake operating force from the simulator piston through the elastic member, and a pressure adjusting valve which activates according to the displacement of the input piston or the simulator piston to adjust the hydraulic pressure supplied from the hydraulic pressure source to a value corresponding to the brake operating force, a master cylinder having a master piston and activated by the fluid pressure from the pressure adjusting valve, and an auxiliary piston provided between the input piston and the master piston with its front protruding into a fluid chamber for applying the output fluid pressure from the pressure adjusting valve to the master piston of the master cylinder, the auxiliary piston being pushed by the input piston upon failure of a hydraulic line connecting to the fluid chamber and transmitting the brake operating force to the master piston.

According to the present invention, the vehicle brake hydraulic pressure generating device is provided with a shutoff valve which shuts off the communication between the simulator chamber and the atmospheric reservoir when the stroke of the input piston relative to a housing for the input piston exceeds a predetermined value and a check valve which permits the flow of brake fluid from the atmospheric reservoir to the simulator chamber are provided.

As an alternative solution, the vehicle brake hydraulic pressure generating device is provided with a shutoff valve which shuts off the communication between the simulator chamber and the atmospheric reservoir when the stroke of the input piston relative to the auxiliary piston exceeds a predetermined value or a shutoff valve which shuts off the communication between the simulator chamber and the atmospheric reservoir when the stroke of the pressure adjusting valve exceeds a predetermined value.

If the hydraulic pressure source fails, the input piston makes a stroke by a predetermined value or over relative to the housing during brake operation. Thus, the shutoff valve shuts off communication between the simulator chamber and the atmospheric chamber. This seals brake fluid in the simulator chamber. Since the sealing is done in a situation in which reaction force to the brake operating force is scarcely produced, the simulator piston scarcely makes a stroke in this stage. Thereafter, the hydraulic pressure produced in the simulator chamber restricts the stroke of the simulator piston, so that an unavailable stroke is suppressed to a small level.

When the brake is relaxed, brake fluid flows from the atmospheric reservoir into the simulator chamber through the check valve without restriction, so that the simulator piston returns quickly to the original position. Thus, even if the hydraulic pressure source fails during brake operation and quick return and subsequent quick brake operation are carried out, an unavailable stroke is suppressed.

In an arrangement in which communication between the simulator chamber and the atmospheric chamber is shut off by a shutoff vale which closes if the stroke of the input piston relative to the auxiliary piston exceeds a predetermined value, or if the stroke of the pressure adjusting valve exceeds a predetermined value, too, brake fluid is sealed in the simulator chamber by the same function as above if the hydraulic pressure source fails. Thus the stroke of the simulator piston is restricted by the sealed hydraulic pressure. This suppresses an unavailable stroke to a small level. If the hydraulic pressure source fails during brake operation and quick return of the brakes are carried out thereafter, the stroke of the input piston returns to a predetermined value or less relative to the auxiliary piston (or the stroke of the pressure adjusting valve returns to a predetermined value or less). Thus the shutoff valve opens and the simulator piston returns quickly. Thus, the above-described check valve is not necessary.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

The embodiments of this invention will be described with reference to FIGS. 1–3.

Figure 1:
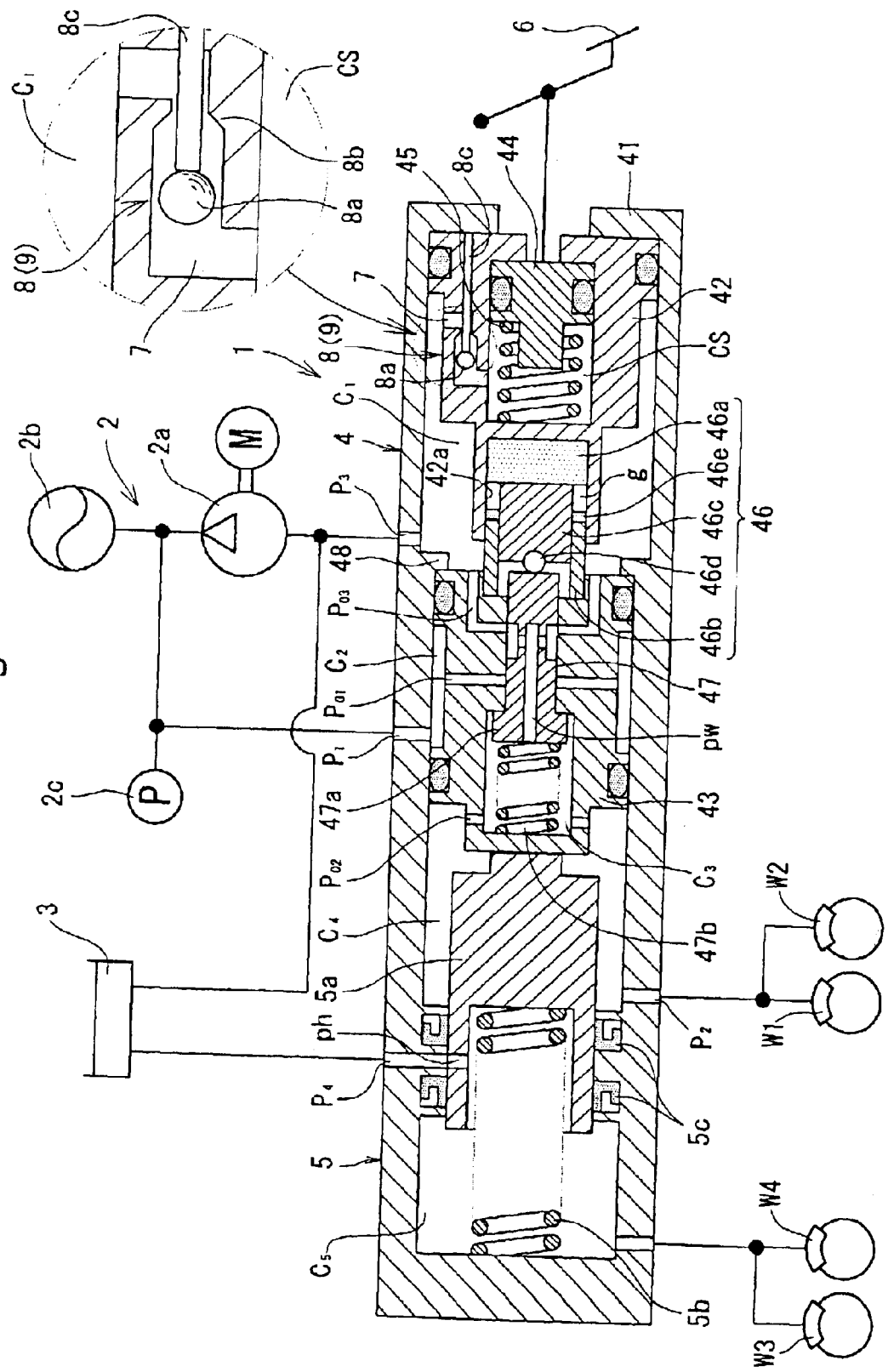
FIG. 1 is a view schematically showing an embodiment of the brake hydraulic pressure generator.
Figure 2:
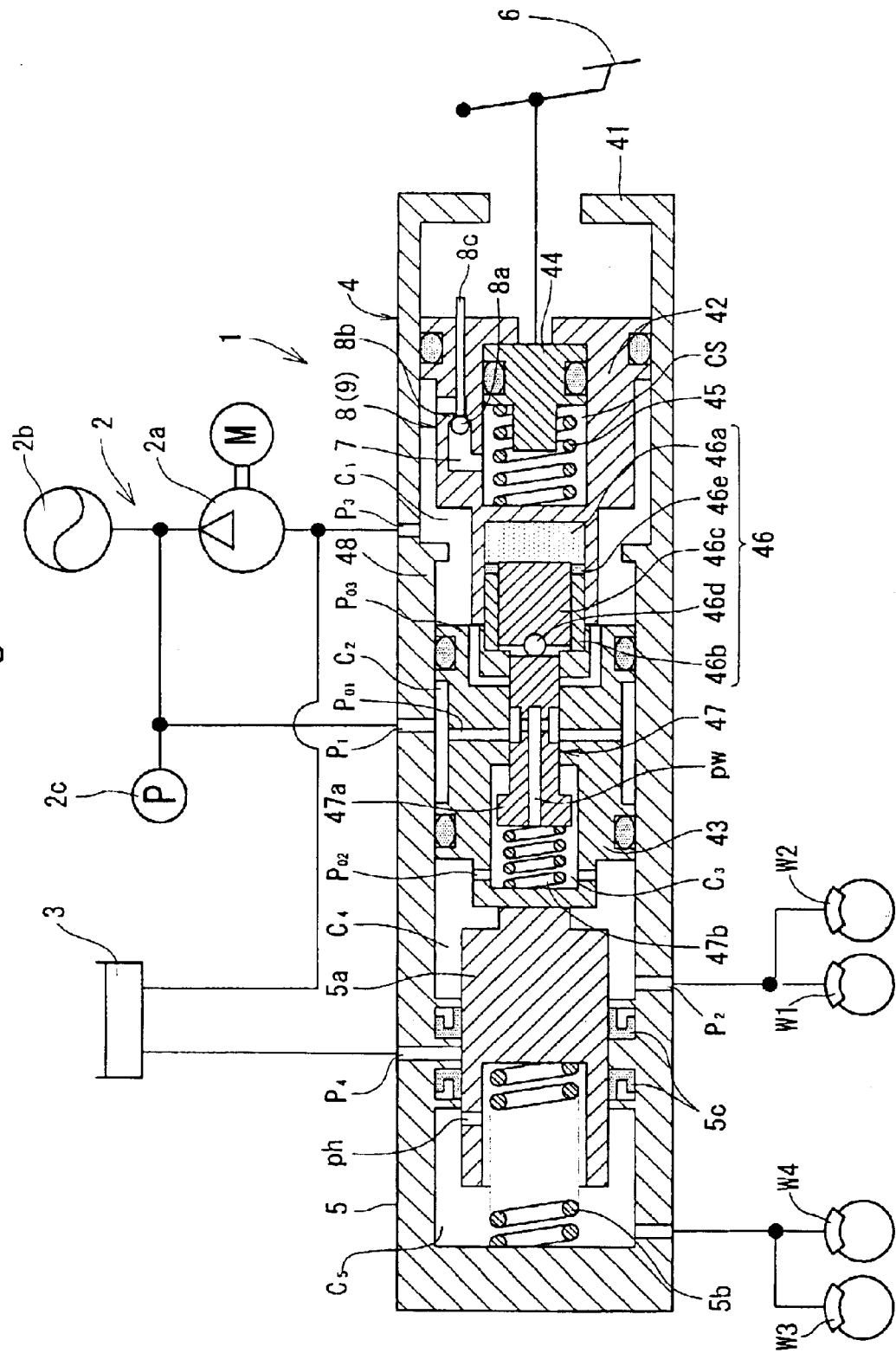
FIG. 2 is a view showing how the device of FIG. 1 operates if the first hydraulic pressure line fails.

The brake hydraulic pressure generator 1 shown in FIG. 1 comprises a hydraulic pressure source 2, an atmospheric reservoir 3, and a pressure adjusting device 4 provided with a master cylinder 5.

The hydraulic pressure source 2 includes a power pump 2a, a pressure accumulator 2b and a pressure sensor 2c. When the hydraulic pressure detected by the pressure sensor 2c reaches a preset lower limit, a command is given from a control device (not shown) that receives signals from the pressure sensor 2c, to activate the pump 2a. When the detected hydraulic pressure reaches a preset upper limit, the pump 2a will stop. Thus, in a normal state, a hydraulic pressure within a predetermined range is always stored in the hydraulic pressure source 2, and the hydraulic pressure is supplied to the pressure adjusting device 4 when the brake is operated.

The atmospheric reservoir 3 is connected to the intake side of the pump 2a, a fluid chamber $C_1$ in the pressure adjusting device 4 and the master cylinder 5.

The pressure adjusting device 4 includes a housing 41, an input piston 42 mounted in the housing 41 with its tip protruding into the fluid chamber $C_1$, an auxiliary piston 43 arranged in front of the input piston 42, a simulator piston 44 provided in the input piston 42 with its front portion in a simulator chamber CS, an elastic member 45 (a coil spring in the figure but a rubber or an air spring may be used singly or in combination) for imparting a stroke corresponding to the brake operating force applied from a brake operating member (a brake pedal 6 in the figure) to the simulator piston 44, a distributor 46 for splitting the brake operating force transmitted from the simulator piston 44 to the input piston 42 through the elastic member 45 and transmitting it to the below-described pressure adjusting valve and an auxiliary piston 43, and a pressure adjusting valve 47 for adjusting the brake hydraulic pressure supplied from the hydraulic pressure source 2 to a value corresponding to the brake operating force. The simulator piston 44, elastic member 45 and simulator chamber CS form a stroke simulator.

The distributor 46 includes a rubber member 46a provided in an annular recess 42a formed in the tip of the input piston 42, a tubular member 46b having its one end abutting the auxiliary piston 43 and the other end inserted in the annular recess 42a, and a transmitting member 46c and a steel ball 46d mounted in the tubular member 46b and disposed between the rubber member 46a and the pressure adjusting valve 47. A gap g is provided between the rubber member 46a and an annular resin plate 46e mounted at the end of the tubular member 46b for protecting the rubber member 46a.

By providing the distributor 46, in the initial stage of brake operation, the brake operating force is transmitted only to the pressure adjusting valve 47 through the rubber member 46a, the transmitting member 46c and the steel ball 46d. When the brake operating force exceeds a certain value, the rubber member 46a, which has been resiliently deformed to get into the gap g, comes into contact with the annular plate 46e. Thereafter, part of the brake operating force is distributed through the tubular member 46b to the auxiliary piston 43 as well.

Thus, this function makes it possible to impart jumping property, which makes sharp the initial buildup of the brake hydraulic pressure adjusted by the pressure adjusting valve 47, to the brake hydraulic pressure generator. Further, if the inner diameter of the tubular member 46b and the outer diameter of the transmitting member 46c change, the distribution ratio of the brake operating forces transmitted to the pressure adjusting valve 47 and the auxiliary piston 43 changes. Further, with changes in the lengths of these members, the distribution start timing changes. Thus, by replacing the tubular member 46b and the transmitting member 46c with ones having different sizes, it is possible to change the relation between the brake operating force and the output hydraulic pressure of the pressure adjusting valve.

In this regard, the provision of the distributor 46 is preferable. But it is possible to omit it and directly transmit the force from the input piston 42 to the pressure adjusting valve 47.

The pressure adjusting valve 47 shown is of a type in which pressure increase, decrease and hold are changed over by a spool 47a.

The auxiliary piston 43 has an input port $P_{01}$, output port $P_{02}$ and a pressure reducing port $P_{03}$. Changeover of connection between these ports and the adjustment of the degree of opening of the valve portions are carried out by displacing the spool 47a.

The input port $P_{01}$ normally communicates with the hydraulic pressure source 2 through an annular input chamber $C_2$ provided around the auxiliary piston 43, and an input port $P_1$ provided in the housing 41. The pressure reducing port $P_{03}$ normally communicates with the atmospheric reservoir 3 through a fluid chamber $C_1$ and a drain port $P_3$ provided in the housing 41. The output port $P_{02}$ is disposed between a fluid chamber $C_3$ in the auxiliary piston 43 and a fluid chamber $C_4$ in which the front portion of the auxiliary piston 43 is disposed, and an internal passage pw provided in the spool 47a communicates with an output port $P_2$ provided in the housing 41.

In the pressure adjusting valve 47 thus structured, when the spool 47a is pushed back by a return spring 47b to the illustrated original position in FIG. 1, the internal passage pw in the spool 47a is connected to the pressure reducing port $P_{03}$ so as to be in the pressure-reduced state. When the spool 47a is pushed in leftwardly in FIG. 1 from this position, the internal passage pw will be separated from both the pressure reducing port $P_{03}$ and the input port $P_{01}$ so as to be in the output holding state. When the spool 47a is further pushed in from this position, the internal passage pw is connected to the input port $P_{01}$, so that the hydraulic pressure supplied from the hydraulic pressure source 2 flows into the fluid chamber $C_4$. Thus, the wheel cylinders W1 and W2 in the right-hand line in FIG. 1 (hereinafter called a first hydraulic pressure line) will be in a pressure-increased state.

The spool 47a moves to a point where the sum of the thrust by the hydraulic pressure introduced into the fluid chamber $C_3$ and the force of the return spring 47b, balances with the brake operating force applied through the input piston 42. Thus, adjustment is made of the degree of opening of a valve portion formed between the input port $P_{01}$ and the shoulder of the spool 47a when the internal passage pw is connected to the input port $P_{01}$, and the degree of opening of a valve portion formed between the pressure reducing port $P_{03}$ and the shoulder of the spool 47a when the internal passage pw is connected to the pressure reducing port $P_{03}$, so that the brake hydraulic pressure outputted from the output port $P_{02}$ will be adjusted to a value corresponding to the brake operating force.

When hydraulic pressure is introduced into the fluid chamber $C_4$, the auxiliary piston 43 is pressed against a stopper 48 in the housing 41 by the hydraulic pressure. Thus, while the hydraulic pressure source 2 and the first hydraulic pressure line are normally operating, the auxiliary piston 43 will be held in the illustrated position.

The master cylinder 5 comprises a master piston 5a having its front portion disposed in a master chamber $C_5$ and its rear portion in a fluid chamber $C_4$, a return spring 5b for the master piston, and two sets of cup seals 5c liquid-tightly sealing the outer periphery of the master piston 5a.

When the output hydraulic pressure is introduced into the fluid chamber $C_4$ through the pressure adjusting valve 47, the master piston 5a moves toward the master chamber $C_5$ under the pressure. In the initial stage of this movement, a hole ph formed in the master piston 5a is separated from a port $P_4$ communicating with the atmospheric reservoir 3.

Thereafter, a fluid pressure substantially equal to the pressure in the fluid chamber $C_4$ is produced in the master chamber $C_5$, and is supplied to the wheel cylinders W3 and W4 in the second hydraulic line.

The master cylinder 5 is provided as fail-safe measures if the hydraulic pressure source 2 or the first hydraulic line should fail. That is, if hydraulic pressure should not be produced in the fluid chamber $C_4$ due to a failure of the hydraulic pressure source 2, the auxiliary piston 43 is moved by the brake operating force applied through the input piston 42 and the brake operating force is directly transmitted to the master piston 5a through the auxiliary piston 43. Thus, hydraulic pressure proportional to the brake operating force is outputted from the master cylinder 5 to the wheel cylinders W3 and W4 in the second hydraulic line. This avoids so-called no braking in which brakes will not work.

The brake hydraulic pressure generator of FIG. 1 is provided with a shutoff valve 8 for shutting off a communicating passage between the simulator chamber CS and the fluid chamber $C_1$ when the input piston 42 has moved from the initial position shown in FIG. 1 by a predetermined stroke or over, and a check valve 9 that allows the flow of brake fluid from the hydraulic chamber $C_1$ toward the simulator chamber CS.

The illustrated shutoff valve 8 comprises a valve body 8a, a valve seat 8b, and a pushrod 8c slidably retained by the input piston 42. With this shutoff valve 8, until the stroke of the input piston 42 relative to the housing 41 exceeds a predetermined value, the pushrod 8c, which is carried by the housing 41, pushes the valve body 8a away from the valve seat 8b, so that the valve opens. The shutoff valve 8 shown is one which is also used as the check valve 9. While an ordinary check valve normally prevents reverse flow of fluid, the illustrated one does not exhibit its checking function until the shutoff valve 8 closes. Thus, if the shutoff valve 8 is adapted to close at or near the normal-state, full-stroke position of the input piston 42, there will be no bad influence on the movement of the simulator piston 44 while the device is normal.

In the device of FIG. 1, upon failure of the hydraulic pressure source 2, movement restriction of the input piston 42 by the auxiliary piston 43 is released. In such a situation, the input piston 42 acted on by the brake operating force is pushed and moved with practically no reaction force. Before the reaction force increases, the input piston 42 moves by a predetermined stroke or over relative to the housing 41, so that as shown in FIG. 2, the shutoff valve 8 will close. Thus, the stroke of the simulator piston 44 produced before the shutoff valve 8 closes is zero or extremely small, and thereafter, pressure is produced in the simulator chamber CS to restrict the stroke, so that an unavailable stroke is suppressed small. In this embodiment, the shutoff valve 8 is adapted to close if, due to a failure of the hydraulic pressure source 2, movement restriction of the input piston by the auxiliary piston 43 is released and the stroke of the input piston 42 relative to the housing 41 exceeds a predetermined stroke. But the shutoff valve 8 may be adapted to close if the stroke of the input piston 42 relative to the auxiliary piston 43 exceeds a predetermined value, or if the stroke of the pressure adjusting valve (which is the spool 47a in this embodiment) exceeds a predetermined value.

Also, the shutoff valve 8 may be adapted to close if the input piston 42 moves by a stroke near the upper limit of the stroke that is conceivable in the normal use region, or if the spool 47a moves by a stroke near the upper limit of the stroke that is conceivable in the normal use region.

Figure 3:
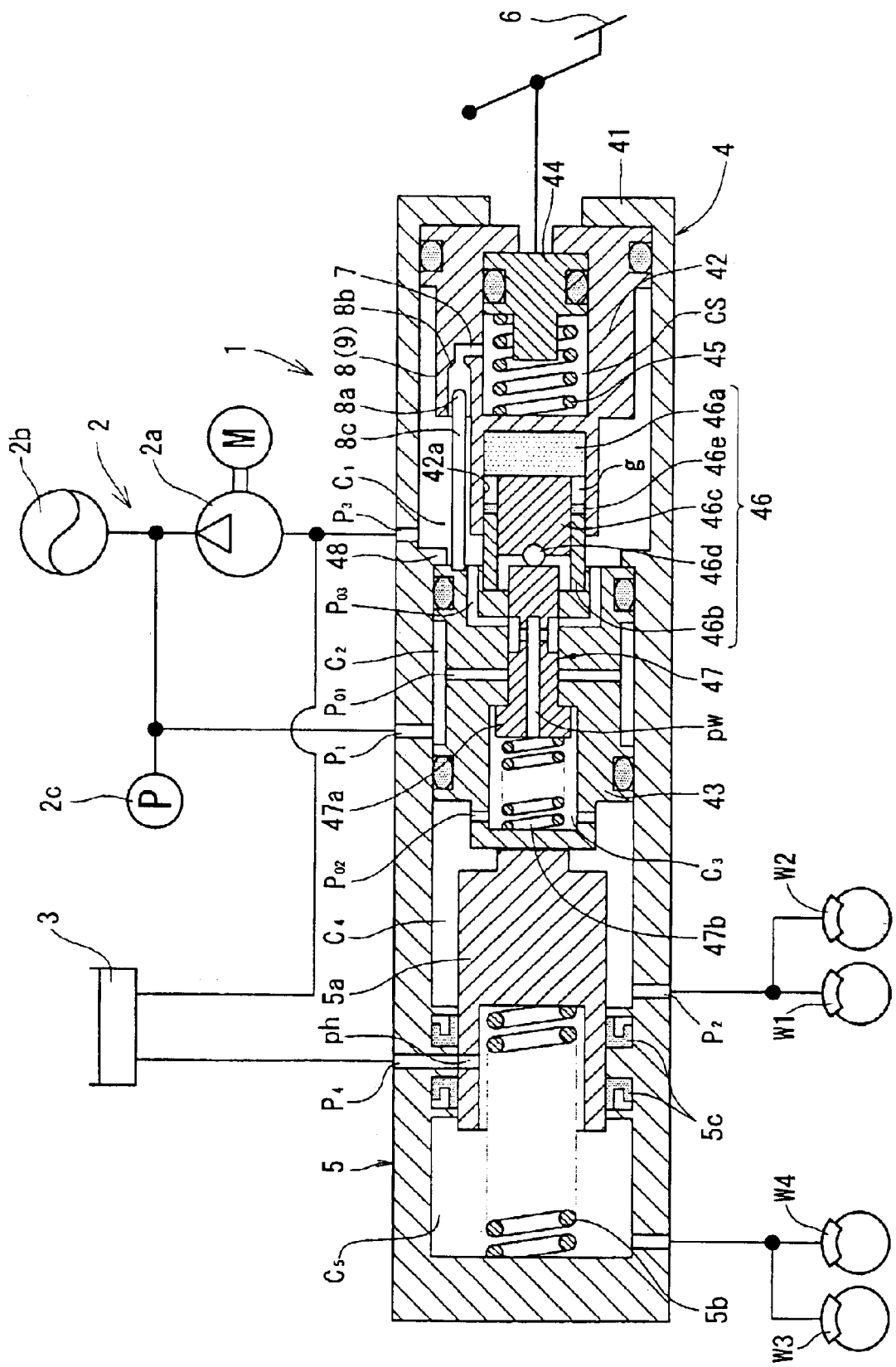
FIG. 3 is a similar view schematically showing another embodiment.

FIG. 3 shows another embodiment in which the pushrod 8c is fixed to the auxiliary piston 43 and the valve body 8a is formed at the tip of the pushrod 8c. When the stroke of the input piston 42 relative to the auxiliary piston 43 reaches a predetermined value (that is, when the stroke of the spool 47a has reached a predetermined value), the valve seat 8b provided on the input piston 42 will contact the valve body 8a and the shutoff valve 8 closes. With this structure, care must be taken so that the stroke of the input piston 42 will not be restricted by the shutoff valve 8 while the device is normally operating without any failure. But it has an advantage in that the check valve 9 of FIG. 1 is not necessary.

If the hydraulic pressure source 2 fails during brake operation and quick return of the brake is carried out, return of the auxiliary piston 43 is delayed in comparison with the return of the input piston 42, so that the shutoff valve 8 will open quickly. Thus, the check valve 9 of FIG. 1 is not necessary.

For the shutoff valve 8 and the check valve 9 in the device of FIG. 1, if one valve is used for both a shutoff valve and a check valve, it will be advantageous in view of working and cost. But they may be provided separately.

This invention is also applicable to such devices as disclosed in JP patent publication 61-37140 and European patent publication EP1078833A2.

As described above, according to this invention, a shutoff valve is provided to shut off the communication between the simulator chamber and the atmospheric chamber if the input piston has moved over a predetermined value relative to the housing or the auxiliary piston, or if the pressure adjusting valve has moved by a predetermined value or over. Thus it is possible to suppress an unavailable stroke of the brake operating member if the hydraulic pressure source fails or if a hydraulic line connecting to the hydraulic pressure source fails. Thus, it is possible to produce a sufficient braking force by activating the master cylinder with a short operating stroke.

For a device in which the opening of the shutoff valve is delayed relative to the return of the brakes, the check valve which permits a flow of brake fluid from the atmospheric chamber to the simulator chamber, is provided so that the return of the simulator piston is carried out quickly. Thus, even if the hydraulic pressure source fails during brake operation and the failure is followed by quick return of the brakes and subsequent quick operation, it is possible to suppress an unavailable stroke. Even under such circumstances, it is possible to generate a sufficient braking force with a short operating stroke.

What is claimed is:

1. A vehicle brake hydraulic pressure generating device provided with a pressure adjusting device including a master cylinder, said vehicle brake hydraulic pressure generating device comprising a hydraulic pressure source for generating a predetermined hydraulic pressure, an atmospheric reservoir, a stroke simulator, said stroke simulator comprising a simulator piston operatively coupled with a brake operating member and an elastic member for imparting a stroke corresponding to the brake operating force to said simulator piston and a simulator chamber formed in front of said simulator piston, an input piston having said simulator piston therein for receiving the brake operating force from said simulator piston through said elastic member, and a pressure adjusting valve which activates according to the displacement of said input piston or said simulator piston to adjust the hydraulic pressure supplied from said hydraulic pressure source to a value corresponding to the brake operating force, a master cylinder having a master piston and activated by the fluid pressure from said pressure adjusting valve, and an auxiliary piston provided between said input piston and said master piston with its front protruding into a fluid chamber for applying the output fluid pressure from said pressure adjusting valve to said master piston of said master cylinder, said auxiliary piston being pushed by said input piston upon failure of a hydraulic line connecting to said fluid chamber and transmitting the brake operating force to said master piston, characterized in that a shutoff valve which shuts off the communication between said simulator chamber and said atmospheric reservoir when the stroke of said input piston relative to a housing for said input piston exceeds a predetermined value and a check valve which permits the flow of brake fluid from said atmospheric reservoir to said simulator chamber are provided.

2. A vehicle brake hydraulic pressure generating device as claimed in claim 1 wherein said shutoff valve comprises a valve body and a valve seat and said check valve is formed by said shutoff valve and said check valve of said shutoff valve.

3. A vehicle brake hydraulic pressure generating device provided with a pressure adjusting device including a master cylinder, said vehicle brake hydraulic pressure generating device comprising a hydraulic pressure source for generating a predetermined hydraulic pressure, an atmospheric reservoir, a stroke simulator, said stroke simulator comprising a simulator piston operatively coupled with a brake operating member and an elastic member for imparting a stroke corresponding to the brake operating force to said simulator piston and a simulator chamber formed in front of said simulator piston, an input piston having said simulator piston therein for receiving the brake operating force from said simulator piston through said elastic member, and a pressure adjusting valve which activates according to the displacement of said input piston or said simulator piston to adjust the hydraulic pressure supplied from said hydraulic pressure source to a value corresponding to the brake operating force, a master cylinder having a master piston and activated by the fluid pressure from said pressure adjusting valve, and an auxiliary piston provided between said input piston and said master piston with its front protruding into a fluid chamber for applying the output fluid pressure from said pressure adjusting valve to said master piston of said master cylinder, said auxiliary piston being pushed by said input piston upon failure of a hydraulic line connecting to said fluid chamber and transmitting the brake operating force to said master piston, characterized in that a shutoff valve is provided which shuts off the communication between said simulator chamber and said atmospheric reservoir when the stroke of said input piston relative to said auxiliary piston exceeds a predetermined value.

4. A vehicle brake hydraulic pressure generating device provided with a pressure adjusting device including a master cylinder, said vehicle brake hydraulic pressure generating device comprising a hydraulic pressure source for generating a predetermined hydraulic pressure, an atmospheric reservoir, a stroke simulator, said stroke simulator comprising a simulator piston operatively coupled with a brake operating member and an elastic member for imparting a stroke corresponding to the brake operating force to said simulator piston and a simulator chamber formed in front of said simulator piston, an input piston having said simulator piston therein for receiving the brake operating force from said simulator piston through said elastic member, and a pressure adjusting valve which activates according to the displacement of said input piston or said simulator piston to adjust the hydraulic pressure supplied from said hydraulic pressure source to a value corresponding to the brake operating force, a master cylinder having a master piston and activated by the fluid pressure from said pressure adjusting valve, and an auxiliary piston provided between said input piston and said master piston with its front protruding into a fluid chamber for applying the output fluid pressure from said pressure adjusting valve to said master piston of said master cylinder, said auxiliary piston being pushed by said input piston upon failure of a hydraulic line connecting to said fluid chamber and transmitting the brake operating force to said master piston, characterized in that a shutoff valve is provided which shuts off the communication between said simulator chamber and said atmospheric reservoir when the stroke of said pressure adjusting valve has exceeded a predetermined value.

* * * * *